June 17, 1958
M. L. EDWARDS
2,839,248
PNEUMATIC CONDITION RESPONSIVE SYSTEM
Filed April 26, 1954
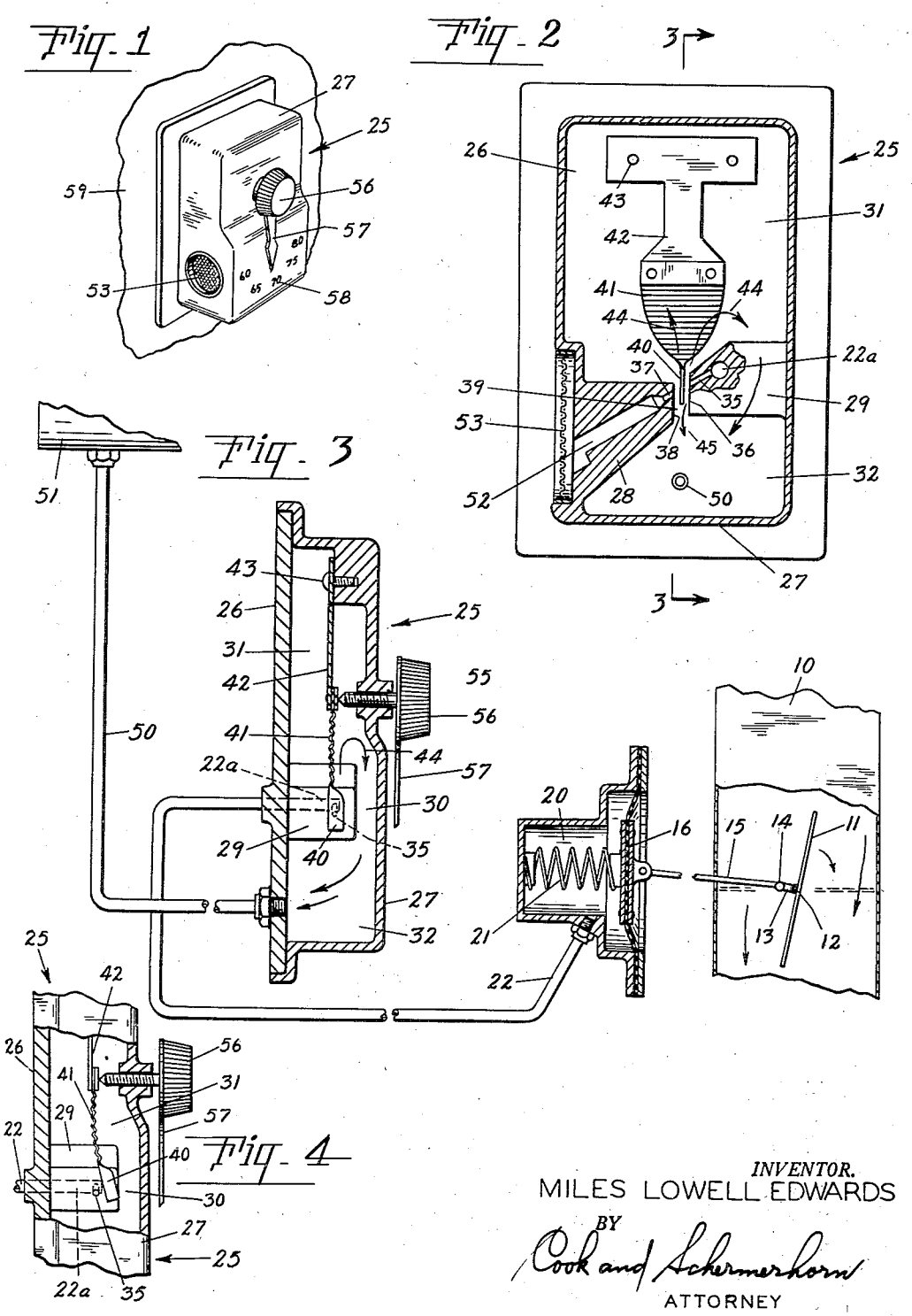
INVENTOR.
MILES LOWELL EDWARDS
BY
Cook and Schermerhorn
ATTORNEY

United States Patent Office 2,839,248
Patented June 17, 1958

2,839,248

PNEUMATIC CONDITION RESPONSIVE SYSTEM

Miles Lowell Edwards, Portland, Oreg.

Application April 26, 1954, Serial No. 425,668

6 Claims. (Cl. 236—87)

This invention relates to a pneumatic system for indicating and/or controlling a condition of the atmosphere in a room or space. The invention is applicable to various conditions which may be indicated or controlled, such as temperature, humidity, or the concentration of some other vapor or gas such as carbon monoxide, carbon dioxide, and the like.

Conventional systems of the type described, such as temperature control systems for regulating the heating or cooling effect in an enclosed space, are usually rather delicate, complicated and expensive, involving thermostatic switches, anticipating heater coils, relays, motors and other electrical components. Such systems operate on a temperature differential principle which is inherently unstable and produces relatively wide range "hunting," resulting in temperature fluctuations and general inefficiency.

An object of the present invention is to provide a simplified condition responsive system involving components which are less expensive and delicate than the conventional electrical equipment.

Another object is to provide a condition responsive system in which the moving parts are substantially free of any tendency to stick or wear.

Another object is to provide a highly sensitive and efficient modulating type of control which does not operate on a differential principle.

Another object is to provide a sensitive condition responsive system which is not disturbed by vibration.

Another object is to provide a vacuum operated temperature control system which is particularly adapted for use in vehicles driven by internal combustion engines.

The illustrated embodiment of the invention comprises a novel form of temperature responsive pneumatic control device and a vacuum operated servo-motor for adjusting a regulating damper or valve for a thermal medium in a heating or cooling system. The present control system constitutes another application of certain principles illustrated and explained in my prior Patent No. 2,655,316, entitled Mixing Valve, issued October 13, 1953. In said patent a hot liquid and a cold liquid are mixed to a predetermined temperature by a valve mechanism sensitively controlled by the deflection or interception of a minute jet of liquid passing between a fine nozzle opening and a receiving orifice. The liquid jet is deflected or intercepted by a thin vane movable transversely of the jet by a bimetallic element which is responsive to the temperature of the mixture. In the present invention the thermostatic unit has been modified to embody a new cooperative relationship of the parts, and the jet is formed of air drawn from the room or other space whose temperature is to be controlled.

The invention will be better understood and additional objects and advantages will become apparent from the following description of the preferred embodiment illustrated on the drawing. Various changes and modifications may be made in the construction and arrangement of parts within the scope of the invention as defined in the appended claims.

In the drawings:

Figure 1 is a perspective view of the thermostat unit for the system of the invention;

Figure 2 is a view of the thermostat unit of Figure 1 with certain parts shown in section;

Figure 3 is a general view of the control system with certain parts shown in section and the thermostat unit being illustrated in a sectional view taken on the line 3—3 of Figure 2; and Figure 4 is a fragmentary sectional view of the thermostat unit shown in Figure 3 with the parts in a different position.

Referring first to Figure 3, the numeral 10 designates a pipe or duct conveying a heating or cooling medium to a space to be maintained at a constant temperature either above or below the temperature of the surrounding atmosphere. For the purpose of describing a specific application of the principles of the invention, the duct 10 will be considered as a conduit for conveying a heating medium to a device, space, compartment or room to be maintained at a constant temperature somewhat higher than the temperature of the outside atmosphere. The duct 10 might, for example, be a hot air pipe from a central heating plant in a house or building, or a hot water pipe supplying an automobile heater. The flow of the heating medium to the space or heat exchanger to be heated is controlled by a valve 11 which in the present illustration takes the form of a damper pivotally mounted on a shaft 12 to swing from a closed position shown in broken lines to an open position shown in full lines. The damper 11 is moved by a crank arm 13 having a pivotal connection at 14 with a longitudinally movable rod 15.

The other end of rod 15 is connected with a diaphragm 16 closing one side of a diaphragm chamber 20 whereby one side of the diaphragm is exposed to a variable fluid pressure in the diaphragm chamber and the other side of the diaphragm is exposed to atmospheric pressure. The exterior force of atmospheric pressure is opposed by a spring 21 which bears against the inside of the diaphragm and tends to bias the diaphragm outwardly from the chamber 20 to close the damper 11 when atmospheric pressure is admitted to the chamber 20. Diaphragm chamber 20 is responsive to the fluid pressure in a pipe 22 which communicates therewith and as the pressure in chamber 20 is reduced the diaphragm moves inwardly to open the damper as shown. The unit comprising diaphragm 16, chamber 20 and spring 21 may be referred to as a servo-motor.

The other end of pipe 22 is connected with a bore 22a in a thermostat unit 25 mounted in the space whose temperature is to be controlled. Thermostat unit 25 is illustrated as a wall mounted room thermostat comprising a base member 26 and a cover or housing member 27 which fit together to form an airtight enclosure. The space within such enclosure is divided into two communicating chambers by a nozzle member 28 and an orifice member 29, which together form a wall extending across the housing. Above such wall is a sensing chamber 31 and below the wall is an outlet chamber 32. The two chambers communicate through a gap or passage 30.

The orifice member 29 contains the previously mentioned bore 22a and an orifice bore 35 connected therewith. Nozzle member 28 contains a nozzle 37 in axial alignment with the receiving orifice 35. The common axis of the nozzle and receiving orifice is oblique to a flat face 38 on the member 28 and a parallel flat face 36 on the member 29. The parallel faces 36 and 38 are spaced apart a slight distance to define a narrow gap or slot 39 therebetween. Nozzle 37 is directed obliquely toward sensing chamber 31 and the bore of orifice 35 is directed obliquely toward outlet chamber 32.

A thin vane 40 is mounted on the free end of a bimetallic strip 41 for movement in the slot 39 perpendicular to the plane of the view in Figure 2. Bimetallic strip 41 is preferably of a conventional corrugated form having its other end mounted on an adjustable spring support 42 secured by means 43 to the housing 27. The bimetallic strip 41 is contained within the sensing chamber 31 with the vane 40 disposed in the slot 39 for movement into and out of intercepting position with respect to a jet of air flowing from nozzle 37 toward the receiving orifice 35. The vane is parallel to, and spaced from, the opposed faces 36 and 38 so as not to obstruct either the nozzle opening or receiving orifice opening at any time and so as not to rub against the faces 36 and 38. The axis of the air jet makes an oblique angle with the surface of the vane whereby, when the jet is intercepted by the vane, the vane deflects the jet from the nozzle 37 into chamber 31 and across the corrugated surface of bimetallic strip 41 as indicated by arrow 44. Any air which may be expelled from receiving orifice 35 is deflected into chamber 32, as indicated by arrow 45. The corrugated form of bimetallic strip 41 provides quick thermal response to the temperature of air passing over its surface and also prevents an undesirable spring bias or snap action which may occur in a truly flat strip. Housing members 26 and 27 are preferably made of some material, such as a suitable plastic, having a low specific heat and low radiating and absorbing properties so as not to retard the prompt response of bimetallic strip 41 to small changes in the temperature of the air in the sensing chamber 31.

By making the nozzle and receiving orifices 37 and 35 relatively small, very minute movements of the vane 40 transversely of the air jet are sufficient to effect a very sensitive and positive control of the damper 11. The necessary force for moving the damper or any other valve mechanism is developed by simply making the diaphragm 16 of the required size to move the mechanism, the diaphragm size, within practical limits, having no adverse effect on the sensitivity of the system. By way of example, I prefer to make the nozzle orifice 37 and receiving orifice 35 .010 inch in diameter. The thickness of vane 40 is preferably .005 inch and the width of slot 39 between the surfaces 36 and 38 is .040 inch. The vane 40 is disposed in a mid position between the surfaces 36 and 38, allowing ample space for air to escape freely from both orifices when the vane is in full intercepting position as shown in Figure 3. The vane is stiff enough to maintain said mid position and resist deflection by the force of jets and is equipped with a square cut intercepting edge which also is not influenced by the force of the jets. The foregoing dimensions are cited by way of example only and are not intended to be restrictive. It will be appreciated that by reason of the small values of dimensions given above, these features are greatly exaggerated in size on the drawing.

Air is continuously withdrawn from chamber 32 by a pipe 50 connecting with a source of reduced pressure 51 such as a vacuum pump, or, in the case of an automobile installation, the intake manifold of the engine. Air from the space whose temperature is to be controlled is continuously supplied to nozzle 37 under atmospheric pressure through a short passage 52 communicating with an air inlet filter 53. The capacity of pipe 50 to withdraw air from the thermostat housing is considerably greater than the capacity of nozzle 37 to supply air whereby a considerably depressed or subatmospheric pressure capable of operating the diaphragm 16 always exists within the housing 27.

The support 42 for the bimetallic strip 41 comprises a strip of spring material which is biased sufficiently to bear against the end of an adjusting screw 55 on a control knob 56 to afford manual adjustment for the position of vane 40 relative to the jet axis at any particular temperature. Knob 56 is equipped with a pointer 57 movable over a temperature scale 58 on the outside of housing 27. The whole device 25 may be mounted on a wall 59 in the usual position of a room thermostat.

*Operation*

Let it be assumed, first, that the temperature of the space to be controlled is considerably lower than desired, as indicated by the setting of pointer 57, whereby the thermostat unit 25 registers a strong heat demand. The vane 40 then assumes the position illustrated in Figure 3, intercepting the jet from nozzle 37 and preventing this jet from impinging on the orifice 35 to influence the pressure in diaphragm chamber 20. The capacity of pipe 50 to withdraw air from the housing 27 being considerably greater than the capacity of nozzle 37 to supply air, and orifice 35 being shielded from the jet from nozzle 37, the pressure in orifice 35 and in diaphragm chamber 20 assumes the sub-atmospheric value of pressure existing in housing 27. Under such condition, atmospheric pressure acting on the outside of diaphragm 16 presses the diaphragm inwardly, compressing spring 21 and holding the damper 11 in the open position, shown in full lines, to admit heating medium from the duct 10 into the space controlled by the thermostat unit 25.

In conventional wall thermostats there is ordinarily considerable lag in response of the thermostatic element to a change in room temperature because of relatively slow air circulation, shielding effects of the thermostat housing and the specific heat and radiating and absorbing properties of the masses of metal and other parts around the temperature sensitive element. In the present construction, this lag is materially reduced by the thermal properties of the thermostat housing and by reason of the fact that the air whose temperature is to be controlled is drawn continuously into intimate contact with the bimetallic element of the thermostat by the action of the jet from nozzle 37. When the vane 40 is in its heat demand position shown in Figure 3, the jet from the nozzle 37 is immediately deflected over the corrugated surfaces of the bimetallic element 41, as indicated by the arrow 44. In case there is a sudden change of temperature in the room as from opening a door, the new temperature will be communicated immediately and continuously to the bimetallic element, even though the mass of the housing members 26, 27 and other parts have not had time to assume the new room temperature.

Under the assumed conditions, the rising room temperature resulting from the open damper 11 will cause the lower end of bimetallic element 41 to bend to the right causing an edge of the vane 40 partially to intercept the air jet from nozzle 37. A portion of the jet is then deflected in the direction of arrow 44 while another portion may impinge upon the orifice 35 to increase the pressure in bore 22a pipe 22, and diaphragm chamber 20 substantially above the pressure existing in chambers 31 and 32. Such an increase in pressure in the diaphragm chamber 20 pushes the diaphragm 16 outwardly a short distance against the atmospheric pressure and starts to close the damper 11 to reduce the flow of heating medium.

Further movement of the lower end of bimetallic element 41 to the right, as shown in Figure 4, removes the vane 40 entirely from the path of the jet from nozzle 37 and allows the full force of this jet to impinge in the orifice 35. Under such a condition, substantially atmospheric pressure is established in the bore 22a, pipe 22 and diaphragm chamber 20, balancing the atmospheric pressure on the outside of diaphragm 16 and allowing spring 21 to close the damper 11 to its broken line position. The damper will then remain closed until there is a subsequent heat demand from the thermostat.

A renewed heat demand is effected by movement of the vane 40 back into brushing or intercepting position relative to the jet from nozzle 37. When this action occurs, a part or all of the jet is prevented from impinging on orifice 35, and the pressure in bore 22a, pipe 22 and diaphragm chamber 20 again falls below atmospheric pressure. Then, atmospheric pressure acting on the outside of diaphragm 16 pushes the diaphragm inward, partially opening the damper 11. Inward movement of the diaphragm expels a quantity of air from the diaphragm chamber 20 through pipe 22, bore 22a and receiving orifice 35. The air which is expelled from orifice 35 at such a time may be relatively cold air if the pipe 22 is disposed in a cold wall or basement, which would produce a spurious response in the bimetallic element 41. This is avoided by the oblique angle of orifice 35 with respect to vane 40 and surface 38 which tend to deflect such returning air away from bimetallic element 41 and in the direction of arrow 45 toward the outlet chamber 32 where it cannot influence the bimetallic element. Thus, any air returned from pipe 22 is immediately withdrawn through pipe 50 and the only air which can come into thermal contact with the bimetallic element is the ambient air introduced directly from the room by way of nozzle 37. Even when the vane 40 is entirely removed from the path of the jet from nozzle 37, the oblique direction of this jet causes it to be deflected into the sensing chamber 31 by wall surface 36 and across the surfaces of the bimetallic element 41.

If the position of thermostat unit 25 in the room is well chosen, the present system is effective to prevent wide fluctuations in the room temperature. Since the control is of a gradually variable modulating type and the temperature sensitive element is very quickly responsive to infinitesimal changes in room temperature, the conditions which ordinarily bring about overshooting of the desired temperature are substantially eliminated. The system is not only continuously responsive to any change in temperature, however small, but is equally capable of making minute adjustments in the heat supply corresponding exactly to the magnitude of the demand. This type of response and control is to be distinguished from a thermostatic switch control which inherently requires a finite temperature differential between a condition producing a signal for more heat and a condition producing a signal for less heat. Switch contacts cannot be opened and closed by an infinitesimal movement of a temperature responsive element. Switch contacts are also notoriously subject to sticking, preventing opening, and dust accumulation, preventing closing.

Another advantage of the present system is its inherent stability under conditions of vibration as in a mobile unit. In an automobile, railway car, boat or air craft, for instance, there may be times, at certain speeds, when a bimetallic element might be forced into vibration. In an electrical control system the resulting chattering of the thermostat contacts and relays renders the control system temporarily inoperative but in the present system no adverse effects are experienced. The long air column in duct 22 and diaphragm 16 of the servo-motor cannot respond to and follow a rapid vibration of the vane 40 and so the diaphragm then assumes a position to satisfy the mean demand which is the same demand that would be signalled if the vane were not vibrating.

It will be apparent to persons skilled in the art that the present system is readily adaptable to a cooling system as well as a heating system. All that is necessary is to supply a cooling medium to the duct 10, instead of a heating medium, and change the position of crank arm 13 relative to damper 11 so that the damper will be opened instead of closed by outward movement of the diaphragm 16, or reverse the bimetallic element 41 so that the lower end will bend to the right in Figure 3 upon reduction in temperature instead of increase in temperature. The demand may then be considered as a cold demand instead of a heat demand when the vane 40 occupies its intercepting position shown in Figure 3. It is also possible to adapt the system to control both heating and cooling media for year around temperature control.

It will further be apparent to persons skilled in the art that the damper valve 11 is merely illustrative of one form of a modulating type of control device. Any other type of control device capable of operation by the servo-motor diaphragm 16 may be used, including switch and valve means which are not modulating in character, in installations where gradual, continuous modulation is not important.

The bimetallic strip 41 is illustrative of a condition responsive element which possesses the characteristic of changing its shape with a change in temperature. Such strips, in either straight or coil form, are made of two pieces of metal having different thermal coefficients of expansion. Similar strips may be made of other materials which will change shape or dimensions in response to absorption of moisture from the atmosphere and other devices may be made responsive to a different vapor or gas, to shift the position of vane 40 relative to the axis of nozzle 37 and receiving orifice 35. In each case the nozzle 37 introduces the ambient air possessing the characteristic to be indicated or controlled into continuous intimate contact with the condition responsive element in sensing chamber 31 to minimize lag in response to any change in the condition.

The positions of diaphragm 16 and rod 15 provide a continuous indication of the condition to which the system is made to respond and may be connected in an obvious manner with a conventional dial pointer or chart recording pen, if desired. Where indication only is desired, without control of the particular condition, the duct 10 and damper 11 are not necessary.

Having now described my invention and in what manner the same may be used, what I claim as new and desire to protect by Letters Patent is:

1. A fluid pressure device comprising a housing, an outlet chamber in said housing, a sensing chamber communicating with said outlet chamber, a nozzle in said housing between said outlet chamber and sensing chamber and directed obliquely into said sensing chamber, a receiving orifice in said housing between said outlet chamber and said sensing chamber, said orifice being aligned with said nozzle and directed obliquely into said outlet chamber, a condition responsive element in said sensing chamber, and a vane on said element movable transversely between said nozzle and receiving orifice, said vane being disposed in a plane oblique to the direction of said nozzle and receiving orifice to deflect fluid from said nozzle into said sensing chamber and to deflect fluid expelled from said receiving orifice into said outlet chamber.

2. A pneumatic thermostat unit comprising a housing, a wall in said housing defining an outlet chamber in one end of said housing and a sensing chamber in the other end of said housing, a slot in said wall communicating with both of said chambers, a bimetal element in said sensing chamber adjacent said slot, a nozzle in said wall directed obliquely into said slot toward said bimetal element, an ambient air inlet in said housing connected with said nozzle, a receiving orifice in said wall comprising a tubular bore directed obliquely into said slot toward said outlet chamber, said receiving orifice bore being aligned with said nozzle, and a vane on said bimetal element movable in said slot transversely between said nozzle and receiving orifice.

3. A fluid condition responsive system comprising a sensing chamber, a condition responsive element in said chamber, a nozzle for said fluid directed into said chamber and arranged to pass a stream of said fluid over said element, means for maintaining a continuous flow of said fluid through said nozzle and said chamber and over said element, a receiving orifice disposed in the path of a fluid jet from said nozzle and directed away from said element, control means actuated by the fluid pressure in said receiving orifice, and a vane movable by said element transversely between said nozzle and said orifice to control said pressure in said orifice, said vane being spaced from said nozzle and orifice to permit continuous admission of said fluid from said nozzle to said chamber and continuous pressure response in said orifice to minute movements of said vane across said jet.

4. In a system as defined in claim 3, an ambient air inlet providing a source of fluid for said nozzle, said flow maintaining means comprising suction means communicating with said chamber.

5. A fluid condition responsive device comprising a closed housing, a condition responsive element in said housing, a fluid outlet in said housing at a distance from said element, an inlet nozzle in said housing directed generally toward said element and away from said outlet, a receiving orifice disposed in the path of a jet from said nozzle and directed generally toward said outlet and away from said element, a vane movable by said element transversely between said nozzle and said orifice, and means for connecting said orifice with a fluid pressure operated control mechanism.

6. A fluid condition responsive device comprising a housing, an inlet nozzle in said housing, an orifice member having a receiving orifice aligned with the nozzle axis and a flat face oblique to said axis arranged to deflect a jet from said nozzle to one side of said axis, a condition responsive element disposed on said one side of said axis in the path of said deflected jet, a vane movable by said element transversely between said nozzle and said orifice, said vane being parallel with said oblique face, and a fluid outlet in said housing on the opposite side of said axis in the path of a fluid stream from said orifice deflected by said vane.

References Cited in the file of this patent

UNITED STATES PATENTS

| | | |
|---|---|---|
| 1,764,799 | Kysor | June 17, 1930 |
| 1,953,406 | Hodgson | Apr. 3, 1934 |
| 2,122,693 | Maseng | July 5, 1938 |
| 2,421,565 | Klug | June 3, 1947 |